US010796091B2

(12) United States Patent
Gandhi et al.

(10) Patent No.: US 10,796,091 B2
(45) Date of Patent: *Oct. 6, 2020

(54) ENHANCED PREDICTIVE INPUT UTILIZING A TYPEAHEAD PROCESS

(71) Applicant: Facebook, Inc., Menlo Park, CA (US)

(72) Inventors: Shaheen Ashok Gandhi, Seattle, WA (US); Jasper Reid Hauser, San Francisco, CA (US); Luke St. Clair, Corte Madera, CA (US); David Harry Garcia, Sunnyvale, CA (US); Jenny Yuen, Cambridge, MA (US)

(73) Assignee: Facebook, Inc., Menlo Park, CA (US)

( * ) Notice: Subject to any disclaimer, the term of this patent is extended or adjusted under 35 U.S.C. 154(b) by 750 days.

This patent is subject to a terminal disclaimer.

(21) Appl. No.: 15/495,776

(22) Filed: Apr. 24, 2017

(65) Prior Publication Data

US 2017/0228362 A1  Aug. 10, 2017

Related U.S. Application Data

(63) Continuation of application No. 15/385,574, filed on Dec. 20, 2016, now Pat. No. 9,678,944, which is a (Continued)

(51) Int. Cl.
*G06F 40/274* (2020.01)
*G06N 5/02* (2006.01)
(Continued)

(52) U.S. Cl.
CPC .......... *G06F 40/274* (2020.01); *G06F 3/0482* (2013.01); *G06N 5/02* (2013.01); *G06N 7/005* (2013.01); *G06Q 50/01* (2013.01); *H04L 51/32* (2013.01); *H04L 67/10* (2013.01); *G06F 40/134* (2020.01); *G06N 5/003* (2013.01); *G06N 5/04* (2013.01); *G06N 20/00* (2019.01); *G06Q 30/02* (2013.01); *H04L 67/02* (2013.01); *H04L 67/20* (2013.01); *H04L 67/306* (2013.01)

(58) Field of Classification Search
CPC .. G06F 17/276; G06F 3/0482; G06F 17/2235; G06F 40/274; G06F 40/134; G06N 7/005; G06N 5/02; G06N 20/00; G06N 5/04; G06N 5/003; H04L 51/32; H04L 67/10; H04L 67/306; H04L 67/20; H04L 67/02; G06Q 50/01; G06Q 30/02
USPC .......................................................... 706/46
See application file for complete search history.

(56) References Cited

U.S. PATENT DOCUMENTS 8,572,129 B1 * 10/2013 Lee et al. ...................... 707/798

* cited by examiner

*Primary Examiner* — Kakali Chaki
*Assistant Examiner* — Ababacar Seck
(74) *Attorney, Agent, or Firm* — Jordan IP Law, LLC

(57) ABSTRACT

Particular embodiments may locally store, at a client device of a first user, information associated with a plurality of nodes and a plurality of edges of a social graph received from a social-networking system. The first user may be associated with a first node of the social graph. The client device may detect that the first user is entering an input term. The client device may provide predictive typeahead results as the first user enters the input term. The predictive typeahead results may be based on the input term. Each predictive typeahead result may correspond to one of the nodes of the social graph stored locally on the client device. Each predictive typeahead result may include at least one image associated with the corresponding node.

20 Claims, 8 Drawing Sheets

Related U.S. Application Data continuation of application No. 14/728,277, filed on Jun. 2, 2015, now Pat. No. 9,575,956, which is a continuation of application No. 13/631,489, filed on Sep. 28, 2012, now Pat. No. 9,135,555.

(51) Int. Cl.

| | |
|---|---|
| *G06Q 50/00* | (2012.01) |
| *H04L 12/58* | (2006.01) |
| *G06F 3/0482* | (2013.01) |
| *G06N 7/00* | (2006.01) |
| *H04L 29/08* | (2006.01) |
| *G06N 20/00* | (2019.01) |
| *G06F 40/134* | (2020.01) |
| *G06N 5/00* | (2006.01) |
| *G06N 5/04* | (2006.01) |
| *G06Q 30/02* | (2012.01) |

ENHANCED PREDICTIVE INPUT UTILIZING A TYPEAHEAD PROCESS

PRIORITY

This application is a continuation under 35 U.S.C. § 120 of U.S. patent application Ser. No. 15/385,574, filed 20 Dec. 2016, which is a continuation under 35 U.S.C. § 120 of U.S. patent application Ser. No. 14/728,277, filed 2 Jun. 2015, issued as U.S. Pat. No. 9,575,956 on 21 Feb. 2017, which is a continuation under 35 U.S.C. § 120 of U.S. patent application Ser. No. 13/631,489, filed 28 Sep. 2012, issued as U.S. Pat. No. 9,135,555 on 15 Sep. 2015.

TECHNICAL FIELD

The present disclosure relates generally to social networking, and more particularly to an integrated social network environment and social graph map based on the social network environment that includes nodes representing users and concepts in the social network environment as well as edges that define or represent connections between such nodes. The present disclosure relates to processes for utilizing information extracted from the social graph to dynamically determine recommendations, such as recommended web pages corresponding to recommended nodes, for display to a user of the social network environment as the user is entering an input into a computing device.

BACKGROUND

Computer users are able to access and share vast amounts of information through various local and wide area computer networks including proprietary networks as well as public networks such as the Internet. Typically, a web browser installed on a user's computing device facilitates access to and interaction with information located at various network servers identified by, for example, associated uniform resource locators (URLs). Conventional approaches to enable sharing of user-generated content include various information sharing technologies or platforms such as social networking websites. Such websites may include, be linked with, or provide a platform for applications enabling users to view "profile" pages created or customized by other users where visibility and interaction with such profiles by other users is governed by some characteristic set of rules. By way of example, a user profile may include such user-declared information as contact information, background information, job/career information, as well as interests.

A traditional social network is a social structure made of individuals, groups, entities, or organizations generally referred to as "nodes," which are tied (connected) by one or more specific types of interdependency. Social network (graph) analysis views social relationships in terms of network theory consisting of nodes and edges. Nodes are the individual actors within the networks, and edges are the relationships between the actors. The resulting graph-based structures are often very complex. There can be many kinds of edges between nodes. In its simplest form, a social network, or social graph, is a map of all of the relevant edges between all the nodes being studied.

Figure 1:
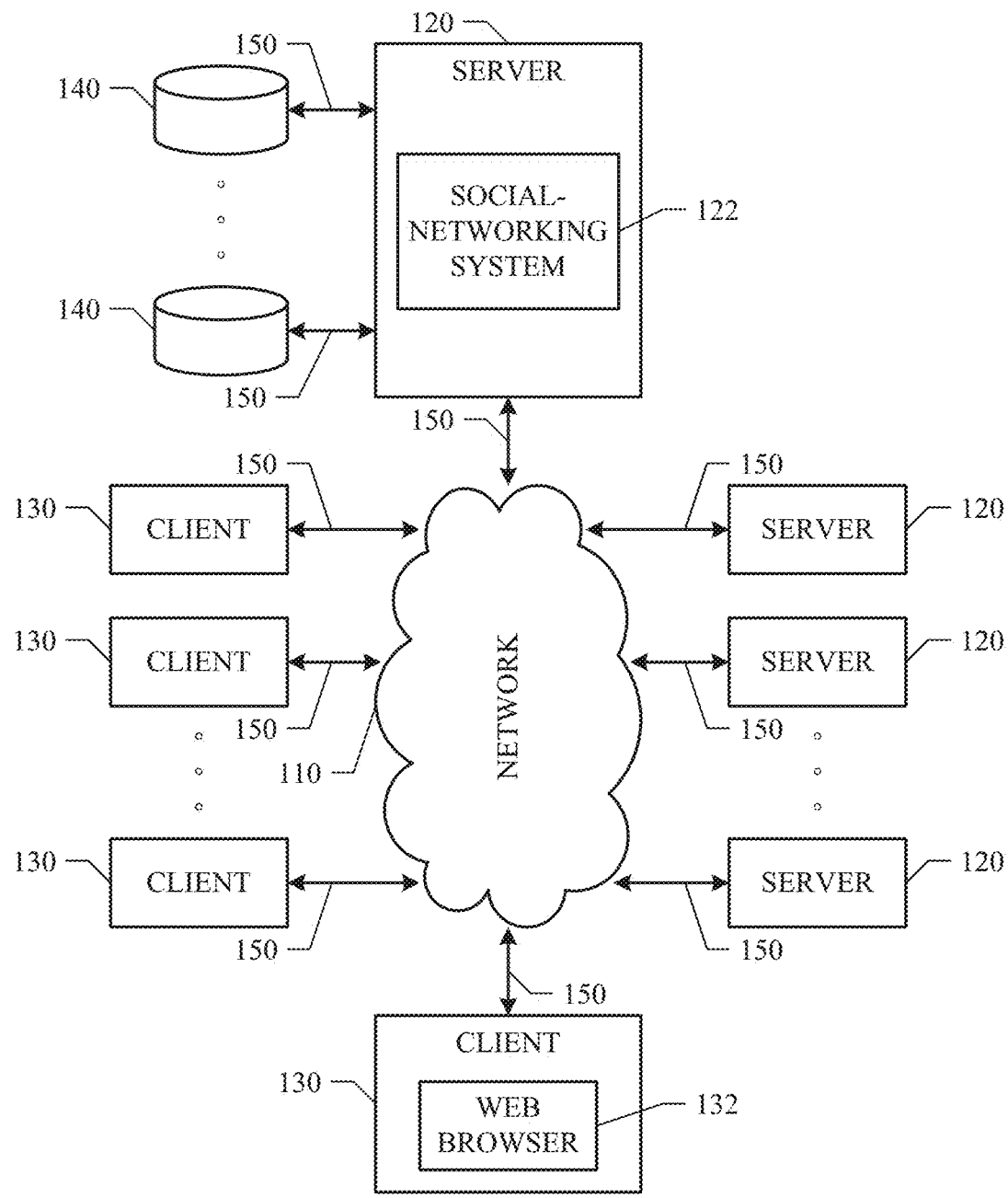
FIG. 1 illustrates an example network architecture associated with a social network.

The figures depict various embodiments of the present disclosure for purposes of illustration only. One skilled in the art will readily recognize from the following discussion that alternative embodiments of the structures and methods illustrated herein may be employed without departing from the principles of the invention described herein.

DESCRIPTION OF EXAMPLE EMBODIMENTS

Particular embodiments relate to a social network environment that includes an infrastructure or platform (hereinafter infrastructure and platform may be used interchangeably) enabling an integrated social network environment. In the present disclosure, the social network environment may be described in terms of a social graph including social graph information. In particular embodiments, one or more computing systems of the social network environment implementing the social network environment include, store, or have access to a data structure that includes social graph information for use in implementing the social network environment described herein. In particular embodiments, the social graph information includes a first set of user nodes that each correspond to a respective user, and a second set of concept nodes that each correspond to a respective concept. As used herein, a "user" may be an individual (human user), an entity (e.g., an enterprise, business, or third party application), or a group (e.g., of individuals or entities) that interacts or communicates with or over such a social network environment. As used herein, a "concept" may refer to virtually anything that a user may declare or otherwise demonstrate an interest in, a like towards, or a relationship with, such as, by way of example, a sport, a sports team, a genre of music, a musical composer, a hobby, a business (enterprise), an entity, a group, a third party application, a celebrity, a person who is not a registered user, etc. In particular embodiments, each node has, represents, or is represented by, a corresponding web page ("profile page") hosted or accessible in the social network environment. By way of example, a user node may have a corresponding user profile page in which the corresponding user can add content, make declarations, and otherwise express him or herself, while a concept node may have a corresponding concept profile page ("hub") in which a plurality of users can add content, make declarations, and express themselves, particularly in relation to the concept. In particular embodiments, the social graph information further includes a plurality of edges that each define or represent a connection between a corresponding pair of nodes in the social graph.

In some embodiments, each edge may be one of a plurality of edge types based at least in part on the types of nodes that the edge connects in the social graph. By way of example, in one particular embodiment, each edge from a first edge type defines a connection between a pair of user nodes from the first set, while each edge from a second edge type defines a connection between a user node from the first set and a concept node from the second set. Furthermore, each edge from a third edge type may define a connection between a pair of concept nodes from the second set. In such embodiments, the edge itself may store, or be stored with, data that defines a type of connection between the pair of nodes the edge connects, such as, for example, data describing the types of the nodes the edge connects (e.g., user or concept), access privileges of an administrator of one of the pair of nodes connected by the edge with respect to the other node the edge connects to (e.g., read or write access of an administrator of one node with respect to the other node connected by the edge), or data describing how or why the edge was first initialized or created (e.g., in response to an explicit user action or declaration, or automatically without an explicit user action), the strength of the connection as determined by various factors or criteria related to or shared by the nodes connected by the edge, among other suitable or relevant data. In an alternate embodiment, each edge may simply define or represent a connection between nodes regardless of the types of nodes the edge connects; that is, the edge itself may store, or be stored with, identifiers of the nodes the edge connects but may not store, or be stored with, data that describes a type of connection between the pair of nodes the edge connects. Furthermore, in any of these or other embodiments, data that may indicate the type of connection or relationship between nodes connected by an edge may be stored with the nodes themselves.

Particular embodiments further relate to a method for automatically generating nodes and edges based on information currently being entered by a user of a social network environment. In particular embodiments, one or more client-side and/or backend (server-side) processes implement and utilize a "typeahead" feature to automatically attempt to match concepts corresponding to respective existing nodes to information currently being entered by a user in an input form rendered in conjunction with a requested web page, such as a user profile page, which may be hosted or accessible in, by the social network environment. In particular embodiments, when a match is found, these or other processes may then automatically generate an edge from a node corresponding to the user (the user's node) to the existing node corresponding to the concept match. Particular embodiments further relate to one or more processes that automatically create a new node and an edge from the new node to the user's node when a match to an existing concept and corresponding node is not found, or at least not found with a desired level of certainty. By way of example, as will be described below, various web pages hosted or accessible in, the social network environment such as, for example, user profile pages, enable users to add content, declare interests, or otherwise express themselves (hereinafter also referred to collectively as "declarations"), including by linking to, or otherwise referencing additional content, such as media content (e.g., photos, videos, music, text, etc.), uniform resource locators (URLs), an other nodes, via their respective profile pages or other concept profile pages. Such declarations may then be viewable by the authoring users as well as other users. In particular embodiments, as a user is entering text to make a declaration, the typeahead feature attempts to match the string of textual characters being entered in the declaration to strings of characters (e.g., names) corresponding to existing concepts (or users) and corresponding concept (or user) nodes in the social graph. In particular embodiments, when a match is found, the typeahead feature may automatically populate the form with a node name (or other identifier) of the existing node and, as just described, cause an edge to be created between the matching existing node and the user's node. In particular embodiments, as a user continues to enter text and the typeahead feature determines that all or a portion of the declaration does not match any existing node, at least according to a statically or dynamically determined level of certainty, the typeahead feature may cause the social network environment to automatically create a new node based on the declaration entered by the user, as well as an edge from the user's node to the new node. Prediction and display of results using a typeahead feature is discussed in further detail in U.S. patent application Ser. No. 12/763,132, filed on 19 Apr. 2010, titled "Dynamically Generating Recommendations Based on Social Graph Information," and issued as U.S. Pat. No. 8,180,804 on 15 May 2012, which is incorporated herein by reference.

Particular embodiments further relate to a method for automatically generating nodes and edges based on information previously entered by users of a social network environment. In particular embodiments, one or more backend (server-side) processes implement and utilize a "bootstrapping" feature to automatically attempt to match known concepts indexed in a data store, each of which may or may not be associated with or correspond to a respective existing node in the social graph, to information previously entered by a user in one or more of a variety of forms or formats and stored in the social network environment. In particular embodiments, when a match to a known concept is found, these or other processes may then automatically generate an edge from a node corresponding to the user (for which the previously entered information was matched) to an existing node corresponding to the concept match. Particular embodiments further relate to one or more processes that, when a match to a known concept is found but where no node currently exists for the known concept, automatically create a new node for the known concept and an edge from the new node to the user's node. Particular embodiments further relate to one or more processes that, when a match to a known concept or existing node is not found, or at least not found with a desired level of certainty, automatically create a new node based on the previously entered information and an edge from the new node to the user's node.

Particular embodiments further relate to a method for populating a "concept database" using data obtained from one or more internal or external sources. In particular embodiments, the concept database includes an index of known concepts as well as, in some embodiments, various attributes, metadata, or other information associated with the respective concepts. In particular embodiments, one or more backend (server-side) processes crawl one or more external data sources (e.g., WIKIPEDIA (www.wikipedia.org), FREEBASE (www.freebase.com, available from METAWEB), or the internet in general) to facilitate or aid in generating or populating the concept database. In some embodiments, the concept database may also be augmented with information extracted from users of the social network environment described herein.

Various portions of such a social networking platform may be implemented via a hardware architecture or software framework that enables various software components or processes to implement particular embodiments, as is described in more detail, by way of example and not by way of limitation, below. The platform may include one or more hardware or software components, one or more of which may be located or embodied in one or more consolidated or distributed computing systems. Additionally, as used herein, "or" may imply "and" as well as "or;" that is, "or" does not necessarily preclude "and," unless explicitly stated or implicitly implied.

As just described, in various example embodiments, one or more described web pages or web applications are associated with a social network environment or social networking service. As used herein, a "user" may be an individual (human user), an entity (e.g., an enterprise, business, or third party application), or a group (e.g., of individuals or entities) that interacts or communicates with or over such a social network environment. As used herein, a "registered user" refers to a user that has officially registered within the social network environment (Generally, the users and user nodes described herein refer to registered users only, although this is not necessarily a requirement in other embodiments; that is, in other embodiments, the users and user nodes described herein may refer to users that have not registered with the social network environment described herein). In particular embodiments, a registered user has a corresponding "profile" page stored or hosted by the social network environment and viewable by all or a selected subset of other users. Generally, a user has administrative rights to all or a portion of his or her own respective profile page as well as, potentially, to other pages created by or for the particular user including, for example, home pages, pages hosting web applications, among other possibilities. As used herein, an "authenticated user" refers to a user who has been authenticated by the social network environment as being the user claimed in a corresponding profile page to which the user has administrative rights or, alternately, a suitable trusted representative of the claimed user.

In such embodiments in which edges have or are assigned associated edge types, the edge itself may store, or be stored with, data that defines a type of connection between the pair of nodes the edge connects, such as, for example, data describing the types of the nodes the edge connects, access privileges of an administrator of one of the pair of nodes connected by the edge with respect to the other node the edge connects to (e.g., read or write access of an administrator of one node with respect to the other node connected by the edge), or data describing how or why the edge was first initialized or created (e.g., in response to an explicit user action or declaration, or automatically without an explicit user action), the strength of the connection as determined by various factors or criteria related to or shared by the nodes (or more particularly the users or concepts associated with the respective connected nodes) connected by the edge, among other suitable or relevant data.

In an alternate embodiment, each edge may simply define or represent a connection between nodes regardless of the types of nodes the edge connects; that is, the edge itself may store, or be stored with, identifiers of the nodes the edge connects but may not store, or be stored with, data that describes a type of connection between the pair of nodes the edge connects. Furthermore, in any of these or other embodiments, data that may indicate the type of connection or relationship between nodes connected by an edge may be stored with the nodes themselves. In particular embodiments, the edges, as well as attributes (e.g., edge type and node identifiers corresponding to the nodes connected by the edge), metadata, or other information defining, characterizing, or related to the edges, may be stored (e.g., as data objects) in the social graph database and updated periodically or in response to various actions or factors.

FIG. 1 illustrates an example network environment 100. In the example of FIG. 1, network environment 100 may include a network 110 coupling one or more servers 120 and one or more clients 130 to each other. In particular embodiments, network 110 may be an intranet, an extranet, a virtual private network (VPN), a local area network (LAN), a wireless LAN (WLAN), a wide area network (WAN), a metropolitan area network (MAN), a portion of the Internet, a cellular technology-based network, a satellite communications technology-based network, or another network 110 or a combination of two or more such networks 110. This disclosure contemplates any suitable network 110.

One or more links 150 may couple a server 120 or a client 130 to network 110. In particular embodiments, one or more links 150 may each include one or more wireline, wireless, or optical links 150. In particular embodiments, one or more links 150 may each include an intranet, an extranet, a VPN, a LAN, a WLAN, a WAN, a MAN, a portion of the Internet, a cellular technology-based network, a satellite communications technology-based network, or another link 150 or a combination of two or more such links 150. This disclosure contemplates any suitable links 150 coupling servers 120 and clients 130 to network 110.

In particular embodiments, each server 120 may be a unitary server or a distributed server spanning multiple computers or multiple datacenters. Servers 120 may be of various types, such as, for example and without limitation, web servers, news servers, mail servers, message servers, advertising servers, file servers, application servers, exchange servers, database servers, proxy servers, or any other servers suitable for performing functions and/or processes described herein, or any combination thereof. In particular embodiments, each server 120 may include hardware, software, or embedded logic components or a combination of two or more such components for carrying out the appropriate functionalities implemented or supported by server 120. For example, a web server is generally capable of hosting websites containing web pages or particular elements of web pages. More specifically, a web server may host HTML files or other file types, or may dynamically create or constitute files upon a request, and communicate them to clients 130 in response to HTTP or other requests from clients 130. A mail server is generally capable of providing electronic mail services to various clients 130. A database server is generally capable of providing an interface for managing data stored in one or more data stores. In particular embodiments, a social-networking system 122 may be hosted on a server 120.

In particular embodiments, one or more data storages 140 may be communicatively linked to one or more severs 120 via one or more links 150. In particular embodiments, data storages 140 may be used to store various types of information. In particular embodiments, the information stored in data storages 140 may be organized according to specific data structures. In particular embodiments, each data storage 140 may be a relational database. Particular embodiments may provide interfaces that enable servers 120 or clients 130 to manage, e.g., retrieve, modify, add, or delete, the information stored in data storage 140.

In particular embodiments, each client 130 may be an electronic device including hardware, software, or embedded logic components or a combination of two or more such components and capable of carrying out the appropriate functionalities implemented or supported by client 130. For example and without limitation, a client 130 may comprise a computer system such as: a desktop computer, a notebook or laptop, a netbook, a tablet, an e-book reader, a GPS device, a camera, a personal digital assistant (PDA), a handheld electronic device, a mobile telephone, or another similar processor-based electronic device. This disclosure contemplates any suitable clients 130. A client 130 may enable a network user at client 130 to access network 130. A client 130 may enable its user to communicate with other users at other clients 130. In particular embodiments, a client device 130 may comprise a personal computing device 200 as described in FIGS. 2A and 2B.

A client 130 may have a software application 132, e.g., a web browser, such as MICROSOFT® INTERNET EXPLORER®, GOOGLE CHROME™ or MOZILLA FIREFOX®, and may have one or more add-ons, plug-ins, or other extensions, such as TOOLBAR or YAHOO TOOL-BAR®. A user at client 130 may enter a Uniform Resource Locator (URL) or other address directing the software application 132 to a server 120, and the software application 132 may generate a Hyper Text Transfer Protocol (HTTP) request and communicate the HTTP request to server 120. Server 120 may accept the HTTP request and communicate to client 130 one or more Hyper Text Markup Language (HTML) files responsive to the HTTP request. Client 130 may render a web page based on the HTML files from server 120 for presentation to the user. This disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT®, JAVA®, MICROSOFT® SILVERLIGHT®, combinations of markup language and scripts such as AJAX (Asynchronous JAVASCRIPT® and XML), and the like. Herein, reference to a web page encompasses one or more corresponding web page files (which a browser may use to render the web page) and vice versa, where appropriate.

More particularly, when a user at a client 130 desires to view a particular web page (hereinafter also referred to as a target structured document) hosted by social networking system 122, or a web application hosted by a server 120 and made available in conjunction with social networking system 122, the user's software application 132, e.g., a client-side structured document rendering engine or suitable client application, formulates and transmits a request to social networking system 122. The request generally includes a URL or other document identifier as well as metadata or other information. By way of example, the request may include information identifying the user, such as a user ID, as well as information identifying or characterizing the software application 132 or operating system running on the user's client 130. The request may also include location information identifying a geographic location of the user's client or a logical network location of the user's client, as well as timestamp identifying when the request was transmitted.

In an example implementation, when a request for a web page or structured document hosted by social networking system 122 is received by the social networking system 122, one or more page-generating processes executing within the social networking system 122 typically generate a base web page in the form of a Hyper Text Markup Language (HTML), Extensible Markup Language (XML), or other web browser-supported structured document. The generated structured document is then transmitted in a response, which may comprise one or more portions or partial responses, to the requesting client 130 via a Hypertext Transfer Protocol (HTTP) or other suitable connection for rendering by the software application 132 at the client 130. The structured document may include one or more resources (e.g. JavaScript scripts, code segments, or resources, Cascading Style Sheet (CSS) code segments or resources, image data or resources, video data or resources, etc.), or references to such resources, embedded within the transmitted document. By way of example, a resource embedded in an HTML document may generally be included or specified within a script element, image element, or object element, among others, depending on the type of resource. The element referencing or specifying the resource may include a source attribute (e.g., src) identifying a location of the resource, which may be within a server or data store within social networking system 122 or at one or more external locations, to the client 130 requesting the web page. Typically, upon receipt of the response, the software application 132 or other client document rendering application running at the client 130 then constructs a document object model (DOM) representation of the received structured document and requests the resource(s) (which may be at one or more other external locations) embedded in the document.

In an example implementation, when a registered user of social network environment 20 first requests a web page from social networking system 122 in a given user session, the response transmitted to the user's client device 130 from social networking system 122 may include a structured document generated by a page-generating process for rendering a login page at the client device. The user may then enter his or her user login credentials (e.g., user ID and password), which are then transmitted from the user's client 130 to social networking system 122. Upon successful authentication of the user, social networking system 122 may then transmit a response to the user's software application 132 at the user's client 130 that includes a structured document generated by page-generating process for rendering a user homepage or user profile page at the user's client device. Furthermore, in particular embodiments, and as will be described below, this or a subsequent response may further include one or more executable code segments (e.g., JavaScript) that, when received by the user's client 130, implement a frontend (client-side) typeahead process that executes in conjunction with the user's software application 132.

In one example embodiment, social networking system 122 comprises computing systems that allow users at clients 130 to communicate or otherwise interact with each other and access content, such as user profiles, as described herein. Social networking system 122 is a network addressable system that, in various example embodiments, comprises one or more servers 120 as well as one or more data stores 140 (which may be implemented in or by one or more of a variety of consolidated or distributed computing systems, databases, or data servers). The one or more servers 120 are operably connected to network 110 via, by way of example, a set of routers or networking switches. In an example embodiment, the functionality hosted by the one or more servers 120 may include web or HTTP servers, FTP servers, as well as, without limitation, web pages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), and the like.

Servers 120 may host functionality directed to the operations of social networking system 122. By way of example, social networking system 122 may host a website that allows one or more users, at one or more clients 130, to view and post information, as well as communicate with one another via the website. Hereinafter, servers 120 may be referred to as server 120, although, as just described, server 120 may include numerous servers hosting, for example, social networking system 122, as well as other content distribution servers, data stores, or databases. Data store 140 may store content and data relating to, and enabling, operation of the social networking system 122 as digital data objects including content objects. A data object, in a particular implementation, is an item of digital information typically stored or embodied in a data file, database, or record. Content objects may take many forms, including: text (e.g., ASCII, SGML, HTML), images (e.g., jpeg, tif and gif), graphics (vector-based or bitmap), audio, video (e.g., mpeg), or other multimedia, and combinations thereof. Content object data may also include executable code objects (e.g., games executable within a browser window or frame), podcasts, etc. Logically, data store 140 corresponds to one or more of a variety of separate or integrated databases, such as relational databases and object-oriented databases, that maintain information as an integrated collection of logically related records or files stored on one or more physical systems. Structurally, data store 140 may generally include one or more of a large class of data storage and management systems. In particular embodiments, data store 140 may be implemented by any suitable physical system(s) including components, such as one or more database servers, mass storage media, media library systems, storage area networks, data storage clouds, and the like. In one example embodiment, data store 140 includes one or more servers, databases (e.g., My SQL), and/or data warehouses.

Data store 140 may include data associated with different social networking system 122 users, clients 130, or servers 120, as well as, in particular embodiments, data associated with various concepts. As described above, particular embodiments relate to a social networking system 122 that includes a platform enabling an integrated social network environment. In the following example embodiments, the social network environment may be described or implemented in terms of a social graph including social graph information. In particular embodiments, data store 140 includes a social graph database in which the social graph information for use in implementing the social network environment described herein is stored. In particular embodiments, the social graph information stored by social networking system 122 in data store 140, and particularly in a social graph database, includes a plurality of nodes and a plurality of edges that define connections between corresponding nodes. In particular embodiments, the nodes or edges themselves are data objects that include the identifiers, attributes, and information (including the information for their corresponding profile pages) for their corresponding users or concepts (as described below), some of which is actually rendered on corresponding profile or other pages. The nodes may also include pointers or references to other objects, data structures, or resources for use in rendering content in conjunction with the rendering of the profile pages corresponding to the respective nodes.

Figure 2B:
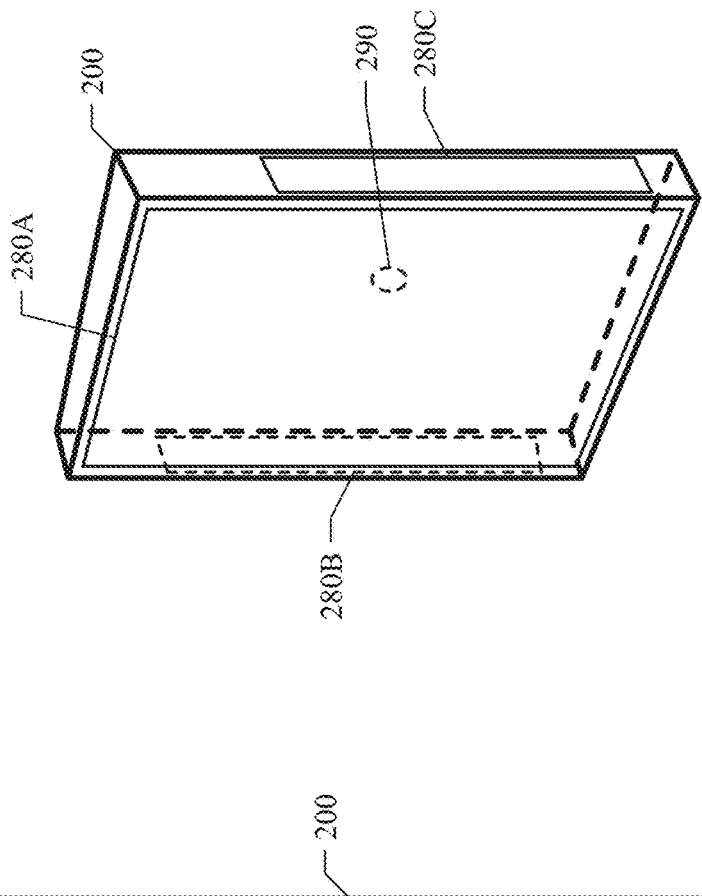
FIGS. 2A-B illustrate an example personal computing device.
Figure 2A:
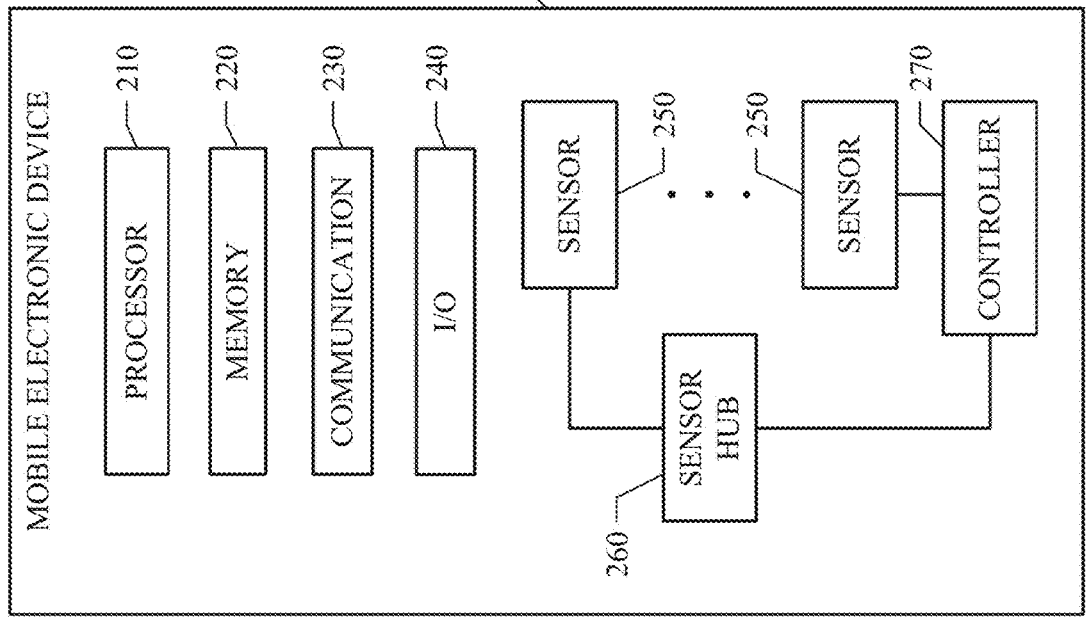

FIG. 2A illustrates an example personal computing device 200. In the example of FIG. 2A, personal computing device 200 may comprise one or more processors 210, one or more memories 220, one or more communication components 230 (e.g., an antenna and communication interface for wireless communications), one or more input and/or output (I/O) components and/or interfaces 240, and one or more sensors 250. In particular embodiments, one or more I/O components and/or interfaces 240 may incorporate one or more sensors 250. In particular embodiments, personal computing device 200 may comprise a computer system or an element thereof as described in FIGURE. 7 and the associated description.

In particular embodiments, a personal computing device, such as a mobile device, may include various types of sensors 250, such as, for example and without limitation: one or more touch sensors (disposed, for example, on a display of the device, the back of the device and/or one or more lateral edges of the device) for detecting a user touching the surface of the mobile electronic device (e.g., using one or more fingers); one or more accelerometers for detecting whether the personal computing device 200 is moving and the speed of the movement; one or more thermometers for measuring the temperature change near the personal computing device 200; one or more proximity sensors for detecting the proximity of the personal computing device 200 to another object (e.g., a hand, desk, or other object); one or more light sensors for measuring the ambient light around the personal computing device 200; one or more imaging sensors (e.g., cameras) for capturing digital still images and/or video of objects near the personal computing device 200 (e.g., scenes, people, bar codes, QR codes, etc.); one or more location sensors (e.g., Global Positioning System (GPS)) for determining the location (e.g., in terms of latitude and longitude) of the mobile electronic device; one or more sensors for detecting communication networks within close proximity (e.g., near field communication (NFC), Bluetooth, RFID, infrared); one or more chemical sensors; one or more biometric sensors for biometrics-based (e.g., fingerprint, palm vein pattern, hand geometry, iris/retina, DNA, face, voice, olfactory, sweat) authentication of user of personal computing device 200; etc. This disclosure contemplates that a mobile electronic device may include any applicable type of sensor or any applicable combination thereof. Sensors may provide various types of sensor data, which may be analyzed to determine the user's intention with respect to the mobile electronic device at a given time.

In particular embodiments, a sensors hub 260 may optionally be included in personal computing device 200. Sensors 250 may be connected to sensors hub 260, which may be a low power-consuming processor that controls sensors 250, manages power for sensors 250, processes sensor inputs, aggregates sensor data, and performs certain sensor functions. In addition, in particular embodiments, some types of sensors 250 may be connected to a controller 270. In this case, sensors hub 260 may be connected to controller 270, which in turn is connected to sensor 250. Alternatively, in particular embodiments, there may be a sensor monitor in place of sensors hub 260 for managing sensors 250.

In particular embodiments, in addition to the front side, personal computing device 200 may have one or more sensors for performing biometric identification. Such sensors may be positioned on any surface of personal computing device 200. In example embodiments, as the user's hand touches personal computing device 200 to grab hold of it, the touch sensors may capture the user's fingerprints or palm vein pattern. In example embodiments, while a user is viewing the screen of personal computing device 200, a camera may capture an image of the user's face to perform facial recognition. In example embodiments, while a user is viewing the screen of personal computing device 200, an infrared scanner may scan the user's iris and/or retina. In example embodiments, while a user is in contact or close proximity with personal computing device 200, chemical and/or olfactory sensors may capture relevant data about a user. In particular embodiments, upon detecting that there is a change in state with respect to the identity of the user utilizing personal computing device 200, either by itself or in combination with other types of sensor indications, personal computing device 200 may determine that it is being shared.

In particular embodiments, in addition to the front side, the personal computing device 200 may have touch sensors on the left and right sides. Optionally, the personal computing device 200 may also have touch sensors on the back, top, or bottom side. Thus, as the user's hand touches personal computing device 200 to grab hold of it, the touch sensors may detect the user's fingers or palm touching personal computing device 200. In particular embodiments, upon detecting that there is a change in state with respect to a user touching personal computing device 200, either by itself or in combination with other types of sensor indications, personal computing device 200 may determine that it is being shared.

In particular embodiments, personal computing device 200 may have an accelerometer in addition to or instead of the touch sensors on the left and right sides. Sensor data provided by the accelerometer may also be used to estimate whether a new user has picked up personal computing device 200 from a resting position, e.g., on a table or desk, display shelf, or from someone's hand or from within someone's bag. When the user picks up personal computing device 200 and brings it in front of the user's face, there may be a relatively sudden increase in the movement speed of personal computing device 200. This change in the device's movement speed may be detected based on the sensor data supplied by the accelerometer. In particular embodiments, upon detecting that there is a significant increase in the speed of the device's movement, either by itself or in combination with other types of sensor indications, personal computing device 200 may determine that it is being shared.

In particular embodiments, personal computing device 200 may have a Gyrometer in addition or instead of the touch sensors on the left and right sides. A Gyrometer, also known as a gyroscope, is a device for measuring the orientation along one or more axis. In particular embodiments, a gyrometer may be used to measure the orientation of personal computing device 200. When personal computing device 200 is stored on a shelf or in the user's bag, it may stay mostly in one orientation. However, when the user grabs hold of personal computing device 200 and lifts it up and/or moves it closer to bring it in front of the user's face, there may be a relatively sudden change in the orientation of personal computing device 200. The orientation of personal computing device 200 may be detected and measured by the gyrometer. If the orientation of personal computing device 200 has changed significantly, In particular embodiments, upon detecting that there is a significant change in the orientation of personal computing device 200, either by itself or in combination with other types of sensor indications, personal computing device 200 may determine that it is being shared.

In particular embodiments, personal computing device 200 may have a light sensor. When personal computing device 200 is stored, for example, in a user's pocket or case, it is relatively dark around personal computing device 200.

On the other hand, when the user brings personal computing device 200 out of the pocket or case, it may be relatively bright around personal computing device 200, especially during day time or in well-lit areas. The sensor data supplied by the light sensor may be analyzed to detect when a significant change in the ambient light level around personal computing device 200 occurs. In particular embodiments, upon detecting that there is a significant increase in the ambient light level around personal computing device 200, either by itself or in combination with other types of sensor indications, personal computing device 200 may determine that it is being shared.

In particular embodiments, personal computing device 200 may have a proximity sensor. The sensor data supplied by the proximity sensor may be analyzed to detect when personal computing device 200 is in close proximity to a specific object, such as the user's hand. For example, mobile device 200 may have an infrared LED (light-emitting diode) 290 (i.e., proximity sensor) placed on its back side. When the user holds such a mobile device in his hand, the palm of the user's hand may cover infrared LED 290. As a result, infrared LED 290 may detect when the user's hand is in close proximity to mobile device 200. In particular embodiments, upon detecting that personal computing device 200 is in close proximity to the user's hand, either by itself or in combination with other types of sensor indications, personal computing device 200 may determine that it is being shared.

A personal computing device 200 may have any number of sensors of various types, and these sensors may supply different types of sensor data. Different combinations of the individual types of sensor data may be used together to detect and estimate a user's current intention with respect to personal computing device 200 (e.g., whether the user really means to take personal computing device 200 out of his pocket and use it). Sometimes, using multiple types of sensor data in combination may yield a more accurate, and thus better, estimation of the user's intention with respect to personal computing device 200 at a given time than only using a single type of sensor data. Nevertheless, it is possible to estimate the user's intention using a single type of sensor data (e.g., touch-sensor data).

FIG. 2B illustrates the exterior of an example personal computing device 200. In the example of FIG. 2B, personal computing device 200 may have approximately six sides: front, back, top, bottom, left, and right. Touch sensors may be placed anywhere on any of the six sides of personal computing device 200. For example, in FIG. 2B, a touch-screen incorporating touch sensors 280A is placed on the front of personal computing device 200. The touchscreen may function as an input/output (I/O) component for personal computing device 200. In addition, touch sensors 280B and 280C may be placed on the left and right sides of personal computing device 200, respectively. Touch sensors 280B and 280C may detect a user's hand touching the sides of personal computing device 200. In particular embodiments, touch sensors 280A, 280B, 280C may be implemented using resistive, capacitive, and/or inductive touch sensors. The electrodes of the touch sensors 280A, 280B, 280C may be arranged on a thin solid piece of material or a thin wire mesh. In the case of capacitive touch sensors, there may be two types of electrodes: transmitting and receiving. These electrodes may be connected to a controller (e.g., controller 270 illustrated in FIG. 2A), which may be a microchip designed to drive the transmitting electrodes with electrical pulses and measure the changes in capacitance from the receiving electrodes caused by a user's touches in order to detect the locations of the user touches.

Of course, personal computing device 200 is merely an example. In practice, a device may have any number of sides, and this disclosure contemplates devices with any number of sides. The touch sensors may be placed on any side of a device.

In particular embodiments, personal computing device 200 may have a proximity sensor 290 (e.g., an infrared LED) placed on its back side. Proximity sensor 290 may be able to supply sensor data for determining its proximity, and thus the proximity of personal computing device 200, to another object.

Figure 3:
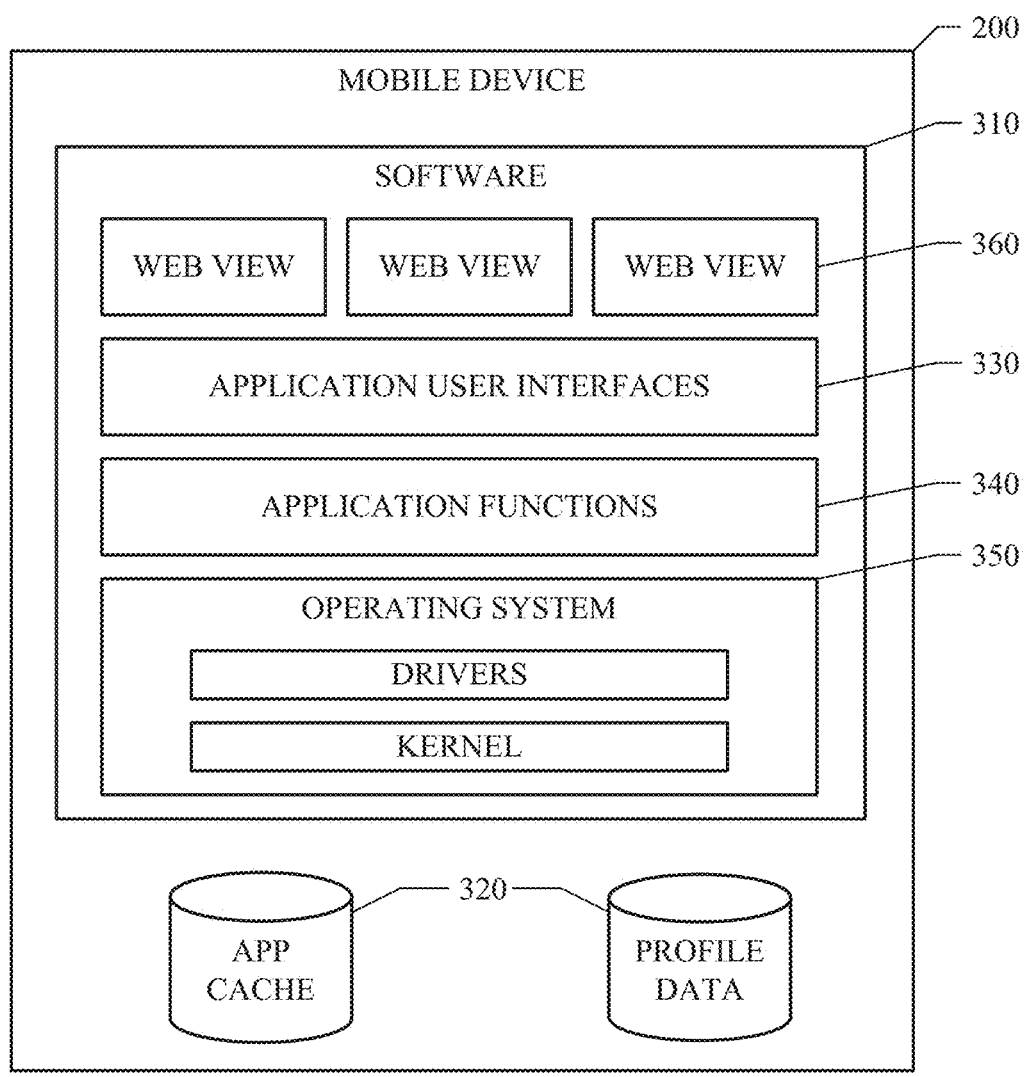
FIG. 3 illustrates an example software architecture for information and applications on a personal computing device.

FIG. 3 illustrates an example software architecture 300 for information and applications on a personal computing device 200. In particular embodiments, software architecture 300 may comprise software 310 and data store(s) 320. In particular embodiments, personal information may be stored in an application data cache 320 and/or a profile data store 320 and/or another data store 320. In particular embodiments, one or more software applications may be executed on personal computing device 200. In particular embodiments, they may be web-based applications hosted on servers. For example, a web-based application may be associated with a URI (Uniform Resource Identifier) or URL (Uniform Resource Locator). From personal computing device 200, a user may access the web-based application through its associated URI or URL (e.g., by using a web browser). Alternatively, in other embodiments, they may be native applications installed and residing on personal computing device 200. Thus, software 310 may also include any number of application user interfaces 330 and application functions 340. For example, one application (e.g., Google Maps®) may enable a device user to view a map, search for addresses and businesses, and get directions; a second application may enable the device user to read, send, and receive emails; a third application (e.g., a web browser) may enable the device user to browse and search the Internet; a fourth application may enable the device user to take photos or record videos using personal computing device 200; a fifth application may allow the device user to receive and initiate VoIP and/or cellular network calls, and so on. Each application has one or more specific functionalities, and the software (e.g., one or more software modules) implementing these functionalities may be included in application functions 340. Each application may also have a user interface that enables the device user to interact with the application, and the software implementing the application user interface may be included in application user interfaces 330. In particular embodiments, the functionalities of an application may be implemented using JavaScript®, Java®, C, or other suitable programming languages. In particular embodiments, the user interface of an application may be implemented using HyperText Markup Language (HTML), JavaScript®, Java®, or other suitable programming languages.

In particular embodiments, the user interface of an application may include any number of screens or displays. In particular embodiments, each screen or display of the user interface may be implemented as a web page. Thus, the device user may interact with the application through a series of screens or displays (i.e., a series of web pages). In particular embodiments, operating system 350 may be Google's Android™ mobile technology platform. With Android®, there is a Java® package called "android.webkit", which provides various tools for browsing the web. Among the "android.webkit" package, there is a Java class called "android.webkit.WebView", which implements a View for displaying web pages. This class uses the WebKit rendering engine to display web pages and includes methods to navigate forward and backward through a history, zoom in, zoom out, perform text searches, and so on. In particular embodiments, an application user interface 330 may utilize Android's WebView application programming interface (API) to display each web page of the user interface in a View implemented by the "android.webkit.WebView" class. Thus, in particular embodiments, software 310 may include any number of web views 360, each for displaying one or more web pages that implement the user interface of an application.

During the execution of an application, the device user may interact with the application through its user interface. For example, the user may provide inputs to the application in various displays (e.g., web pages). Outputs of the application may be presented to the user in various displays (e.g., web pages) as well. In particular embodiments, when the user provides an input to the application through a specific display (e.g., a specific web page), an event (e.g., an input event) may be generated by, for example, a web view 360 or application user interfaces 330. Each input event may be forwarded to application functions 340, or application functions 340 may listen for input events thus generated. When application functions 340 receive an input event, the appropriate software module in application functions 340 may be invoked to process the event. In addition, specific functionalities provided by operating system 350 and/or hardware (e.g., as described in FIGS. 1 and 2A-B) may also be invoked. For example, if the event is generated as a result of the user pushing a button to take a photo with personal computing device 200, a corresponding image processing module may be invoked to convert the raw image data into an image file (e.g., JPG or GIF) and store the image file in the storage 320 of personal computing device 200. As another example, if the event is generated as a result of the user selecting an icon to compose an instant message, the corresponding short message service (SMS) module may be invoked to enable the user to compose and send the message.

In particular embodiments, when an output of the application is ready to be presented to the user, an event (e.g., an output event) may be generated by, for example, a software module in application functions 340 or operating system 350. Each output event may be forwarded to application user interfaces 330, or application user interfaces 330 may listen for output events thus generated. When application user interfaces 330 receive an output event, it may construct a web view 360 to display a web page representing or containing the output. For example, in response to the user selecting an icon to compose an instant message, an output may be constructed that includes a text field that allows the user to input the message. This output may be presented to the user as a web page and displayed to the user in a web view 360 so that the user may type into the text field the message to be sent.

The user interface of an application may be implemented using a suitable programming language (e.g., HTML, JavaScript®, or Java®). More specifically, in particular embodiments, each web page that implements a screen or display of the user interface may be implemented using a suitable programming language. In particular embodiments, when a web view 360 is constructed to display a web page (e.g., by application user interfaces 330 in response to an output event), the code implementing the web page is loaded into web view 360.

Figure 4:
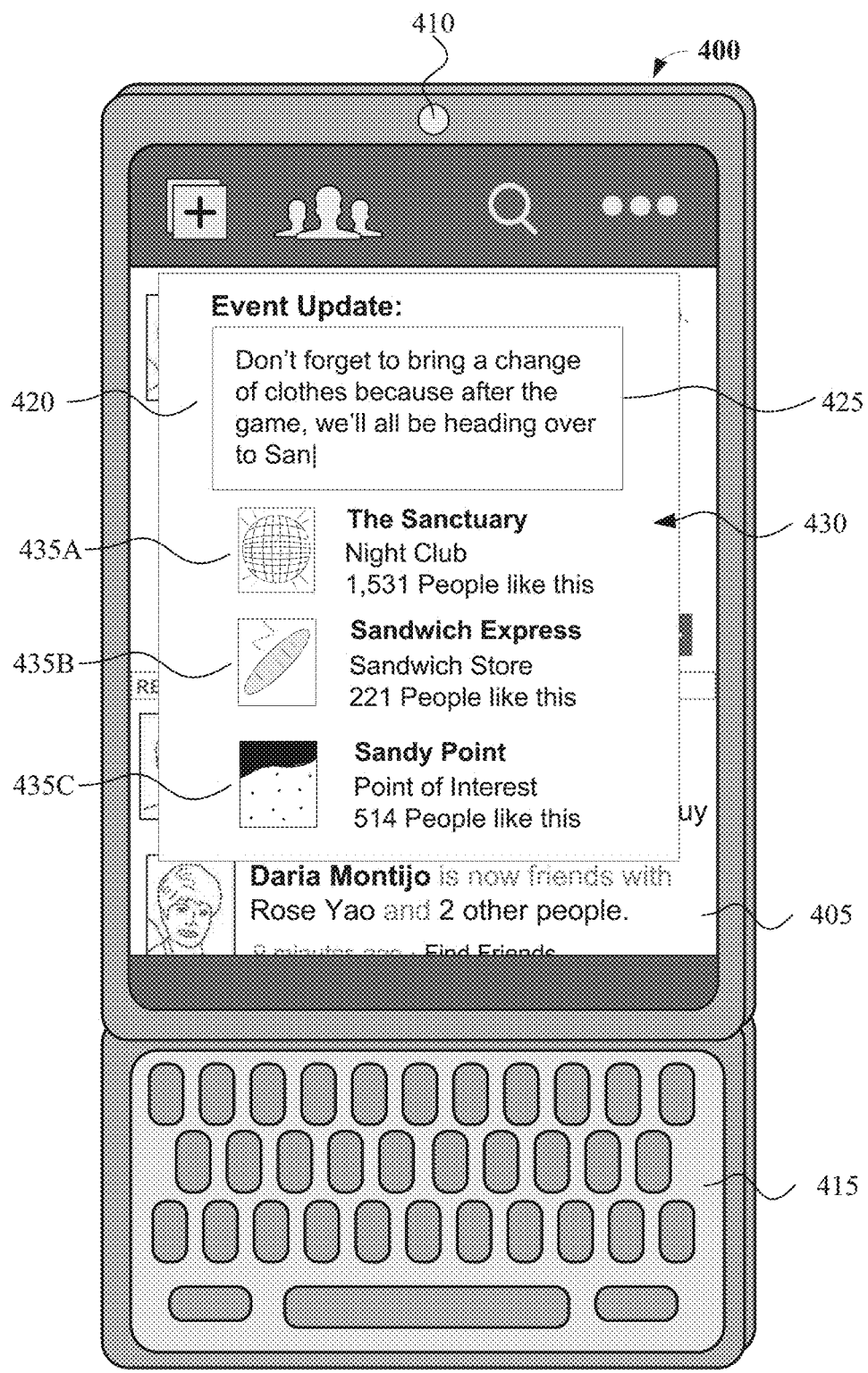
FIG. 4 is an example wireframe illustrating the display of predictive typeahead results to a user based on information associated with a social network.

FIG. 4 illustrates an example of providing predictive typeahead results as a user enters an input term. In the example of FIG. 4, there is an example personal computing device 400, which comprises a personal computing device as described above. In particular embodiments, personal computing device 400 includes a screen 405 and a sensor 410. In particular embodiments, personal computing device 400 may include an input device 415, such as a keyboard. In particular embodiments, screen 405 may also serve as a "touch screen" input device. In particular embodiments, personal computing device may have both an input device 415 and a screen 405 that serves as a "touch screen" input device. In particular embodiments, personal computing device may only have a screen 405 that serves as a "touch screen" input device and performs the function of input device 415.

In particular embodiments, a user of personal computing device 400 may enter an input using input device 415. In particular embodiments, this input may comprise an input term 420, which may be displayed on screen 405. In particular embodiments, input term 420 may comprise a portion of the intended final input term, while in other embodiments, input term 420 may comprise the entire final input term.

In particular embodiments, personal computing device 400 may be client 130, as depicted in FIG. 1, and may communicate with social networking system 122 via network 150.

In particular embodiments, as a user types or otherwise enters input term 420 into input field 425, a frontend typeahead process works in conjunction with one or more backend (server-side) typeahead processes executing at (or within) the social networking system 122 (e.g., within servers 120) to interactively and virtually instantaneously (as appearing to the user) attempt to auto-populate input field 425 with a term (which may comprise any acceptable string of characters, e.g., alphanumeric, space, punctuation, etc.) corresponding to names of existing nodes, or terms associated with existing nodes, determined to be the most relevant or best match to the characters of text entered by the user as the user enters the characters of text. Utilizing the social graph information in social networking system 122, including information associated with nodes as well as edges, the frontend and backend typeahead processes, in conjunction with the information from social networking system 122, are able to predict a user's intended declaration with a high degree of precision. As one of skill in the art would be aware, input field 425 may be used in any context, such as, for example and without limitation, a posting on a bulletin board, a message to one or more friends, a status update, a search field, or any interface for creating any type of text-based content (e.g., event page, calendar item, profile page).

More particularly, as the user enters input term 420, the frontend typeahead process reads the string of entered textual characters and, in particular embodiments, as each keystroke is made, the frontend typeahead process transmits the entered character string as a request (or call) at to the backend typeahead process executing within social networking system 122. In particular embodiments, the frontend and backend typeahead processes may communicate via AJAX (Asynchronous JavaScript and XML) or other suitable techniques, and particularly, asynchronous techniques. In one particular embodiment, the request is, or comprises, an XMLHTTPRequest enabling quick and dynamic sending and fetching of results. In particular embodiments, the frontend typeahead process also transmits before, after, or with the request a section identifier (section ID) that identifies the particular section of the particular page in which the user is making the declaration. In some embodiments, a user ID parameter may also be sent, but this may be unnecessary in some embodiments, as the user is already "known" based on he or she logging into social networking system 122.

In particular embodiments, when the backend typeahead process receives input term 420 as it is being entered by the user, the backend process performs, or causes to be performed (e.g., in conjunction with one or more other search processes executing at social networking system 122), a string search to identify existing nodes having respective names or other identifiers matching the input term, and in particular embodiments, matching a particular category of nodes in the social graph database as determined, at least in part, by the particular section identifier. In various example embodiments, the granularity of the categories may vary. In one embodiment, the backend typeahead process performs string matching; that is, the backend typeahead process attempts to match the latest string of characters received from the frontend typeahead process to an index of strings each corresponding to a name of a node in the social graph database. In particular embodiments, the index of strings is updated periodically or as nodes are added to the social graph database or other index generated from the social graph database. The backend typeahead process may use one or more of a variety of factors when attempting to match the string of entered text and as such may examine one or more of a variety of different aspects or attributes of existing nodes in the social graph database. In particular embodiments, backend typeahead process searches or queries an index of nodes generated from the social graph database in which the nodes are indexed and searchable (or queryable) by category. The backend typeahead process may also use information about the user entering the text including information entered in the user's profile page, information about the users friends, information about other nodes the user is connected with, etc. in order to best match an input term to a node. The backend typeahead process may also attempt to correct spellings or match to synonyms of the user-entered characters or extrapolations of entered characters.

In particular embodiments, the backend typeahead process may use one or more matching algorithms to attempt to identify matching nodes. In particular embodiments, when a match or matches are found, the backend typeahead process may transmit a response (which may utilize AJAX or other suitable techniques) to the user's client device that may include, for example, the names (name strings) of the matching nodes as well as, potentially, other metadata associated with the matching nodes. By way of example, FIG. 4 illustrates the result of the user entering the input term "San" 420 into input field 425. In the example illustrated in FIG. 4, the frontend typeahead process displays a drop-down menu 430 that displays names of matching nodes 435A, 435B, and 435C, which the user can then click on or otherwise select. By way of example, upon clicking "Sandwich Express" the frontend typeahead process auto-populates, or causes the software application 132 to auto-populate, the input field 425 with the declaration "Sandwich Express." In an alternate embodiment, the frontend typeahead process may simply auto-populate the form with the name or other identifier of the top-ranked match rather than display a drop-down menu. In such an embodiment, the user may confirm the auto-populated declaration simply by keying "enter" on his or her input device 415 or by clicking on the auto-populated declaration.

In particular embodiments, information associated with each matching node is presented as a predictive typeahead result that may include an image associated with the node, as well as a reference to a web resource, e.g., a hyperlink to profile page for the node or to a third-party website associated with the node. In particular embodiments, once a particular matching node is selected from drop-down menu 430, the reference to its corresponding web resource may also be included in input field 425 together with the text for the selected matching node. For example, if the "Sandwich Express" node is selected from drop-down menu 430, input field 425 may be populated with the text "Sandwich Express," which may be hyperlinked to a website for Sandwich Express. In particular embodiments, the predictive typeahead result may also include a description for the image. The description may comprise functionality, e.g., using Javascript, that displays the description for the image, e.g., by responding to a mouse placed over the image, showing a popup window, or showing text within the image.

In particular embodiments, the matching nodes 435A-C may be based on social graph information stored in the social graph database, which may be used by the backend typeahead process to better match a string of entered characters of an input term to existing nodes that may be candidates for matching nodes. By way of example, consider an example in which a user types "sandwich" into a input field. In such an example, the backend typeahead process may identify numerous nodes having corresponding names that at least include the name "sandwich," or a derivation thereof (e.g., "sandwiches"). For example, the backend typeahead process may identify a user node associated with a deli called "Sandwich Express." The backend typeahead process may also identify a user node associated with a deli called "Sandwich Makers" and a concept node associated with "Ham Sandwiches" In such cases, all of these three nodes may be matched by the backend typeahead process and hence, all three node names may be transmitted in some embodiments, while in other embodiments, the backend typeahead process may only transmit one matching node name that is determined to be the most relevant based, for example and as described above, on using parameters extracted from the user's profile to determine a category in which the most relevant matching node would be indexed in.

In particular embodiments, the backend typeahead process may determine that the string of entered characters of the input term could correspond to an action or activity represented as an edge between one or more pairs of nodes in the social graph. The concept of actions or activities being represented by edges in a social graph is discussed in further detail with respect to FIG. 7. For example, if the user were to enter the phrase "played" into an input field, the backend typeahead process may identify one or more nodes that could serve as the object of the action "played," such as online social-networking games recently played by the user. In this case, the backend typeahead process may transmit one or more matches, e.g., "played Cookie Hamster," "played Whack-a-Troll," and "played Pina Pony." In another example, if the user were to enter the phrase "ate at" into an input field, the backend typeahead process may identify one or more nodes that could serve as the object of the action "ate at," such as restaurants where the user recently checked in or restaurants for which the user has submitted a review, e.g., "ate at P.F. Chang's," "ate at Mack's BBQ," and "ate at Chipotle."

In particular embodiments, the backend typeahead process may identify matches according to the context in which the input is being entered. For example, if the user is updating their status and has indicated that their current location is Penn Station in New York City, the backend typeahead process may determine matches for the string of entered characters of the input term with respect to this extra information. For example, if the user were to enter the phrase "noshing at" into an input field, the backend typeahead process may identify one or more nodes that could serve as the object of this action, such as the list of eating establishments located at Penn Station. In this case, the backend typeahead process may transmit one or more matches, e.g., "noshing at Krispy Kreme," "noshing at Nathan's Famous," and "noshing at Tracks." In another example, if the user is checking in to Philz Coffee and has entered the phrase "drinking," the backend typeahead process may identify one or more nodes that could serve as the object of this action, such as "drinking a Mint Mojito," "drinking a Tantalizing Turkish espresso," and "drinking a 4 Great Horses cappuccino." In particular embodiments, the backend typeahead process determines matches according to the user's personal historical activity in the particular context in which the input is being entered—for example, the list of coffee drinks at Philz Coffee may be ranked according to the frequency with which the user has previously indicated that they were consuming a particular coffee drink.

Additionally, in some embodiments, other factors may also be used to determine the strength or relevancy of the matching nodes including, by way of example, the number of the user's friends having respective user nodes connected with a matching node, the number of total users having respective user nodes connected with a matching hub node, the number of other nodes connected with the matching node, information obtained by analyzing other nodes connected to both the user's node and a matching node, or other nodes connected to nodes corresponding to friends of the user as well as to a matching node. Moreover, as described below, information characterizing the strength of the connections associated with the edges connecting any of these nodes may also be used to weight their relevancy in determining the most relevant matching node or nodes.

In particular embodiments, there are at least one or two determinations that are made by the backend typeahead process before the frontend typeahead process auto-populates an input field with names corresponding to matched nodes. First, considering the above example, in the case that a plurality of matches to existing nodes are identified, the backend typeahead process may then determine a confidence score for each of the matches that indicates an absolute or relative quality of each of the names of the matching nodes, the quality of the matching nodes themselves, or otherwise a level of confidence that the backend process has that the match is correct (the intended concept the user was entering or trying to enter). This determination at may also result or involve a ranking of the matches (which may be reflected in the order of the matches displayed in the drop-down menu 430).

One or more of numerous factors may be used to determine a confidence score, quality, or ranking of a matching node. By way of example, such factors may again include, as just described, the number of the user's friends having respective user nodes connected with a matching node, the number of total users having respective user nodes connected with a matching node, the number of other nodes connected with the matching hub node, information obtained by analyzing other nodes connected to both the user's node and a matching node, or other nodes connected to nodes corresponding to friends of the user as well as to a matching node.

In particular embodiments, the backend typeahead process may then make a second determination before the frontend typeahead process auto-populates an input field with names corresponding to ranked matched nodes. By way of example, based on the confidence scores, one or both of the frontend and backend typeahead processes may determine whether there is a determined level of certainty or confidence (a confidence score) for each match before the match is displayed to the user in the form of a drop-down menu for selection or auto-populated in the input field. That is, in particular embodiments, even though one or more matches have been identified from the existing nodes in the social graph database, their respective certainties as demonstrated by their determined confidence scores may be below a first predetermined threshold, and hence, none of the matches may be displayed to the user and be auto-populated by the frontend typeahead process. That is, rather than display and provide the user with the match or matches having confidence scores below the threshold, the frontend typeahead process may allow the user to finish typing the input term himself or herself, and then transmit the request. The backend process may determine the best match corresponding to the user's declaration and proceed with calling the edge-generating API to which it passes information about the user's node and information about the existing node to the best matching node, resulting in the creation of an edge between the user's node and the best matching node in the social graph database.

In alternate embodiments, determining a confidence score of each match may be performed as a part of the searching step or determination step. In such embodiments, the determination of whether a match or matches have been found may be based on comparing respective confidence scores determined for the prospective matches with a second predetermined threshold below the first predetermined threshold described above. That is, the second predetermined threshold may be used when determining if a match is found while the first predetermined threshold may be used when determining if the match should be auto populated for display to the user.

Figure 5:
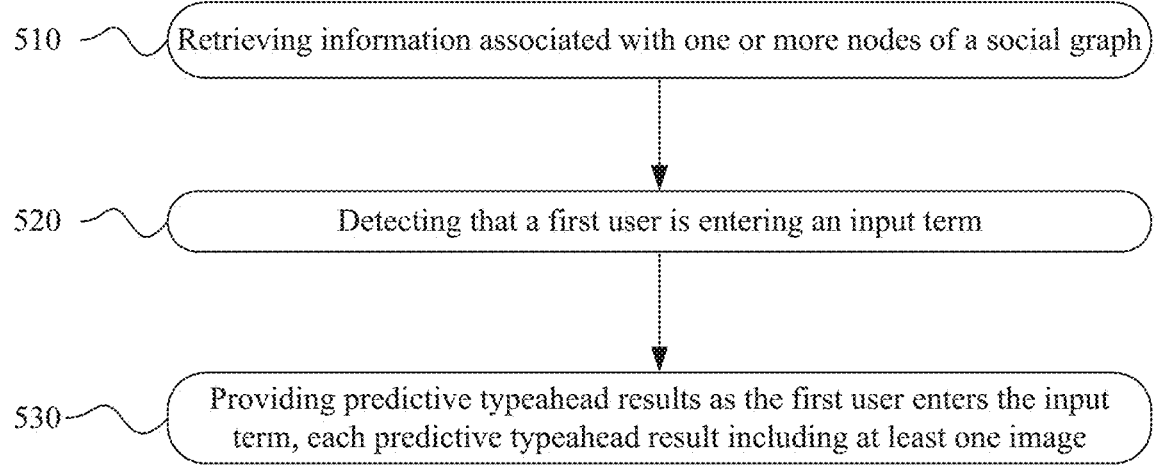
FIG. 5 illustrates an example method for providing predictive typeahead results as a user enters an input term, wherein each predictive typeahead result includes at least one image.

FIG. 5 illustrates an example method for providing predictive typeahead results as a user enters an input term, wherein each predictive typeahead result includes at least one image. The method may start at step 510, where a computing device retrieves information associated with one or more nodes of a social graph. At step 520, the computing device may detect that a first user is entering an input term. At step 530, the computing device may provide predictive typeahead results as the first user enters the input term, each predictive typeahead result including at least one image, at which point the method may end. Particular embodiments may repeat the steps of the method of FIG. 5, where appropriate. Moreover, although this disclosure describes and illustrates particular steps of the method of FIG. 5 as occurring in a particular order, this disclosure contemplates any suitable steps of the method of FIG. 5 occurring in any suitable order. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

In particular embodiments, step 510 may comprise retrieving information associated with one or more nodes of a social graph, wherein the information is stored on one or more data stores. In particular embodiments, these data stores may be data stores 140 depicted in FIG. 1. In particular embodiments, a node may comprise a user node or a concept node. In particular embodiments, each node may be connected by edges to other nodes of a social graph.

In particular embodiments, step 520 may comprise detecting that a first user is entering an input term. In particular embodiments, the first user may enter an input term on input device 415 of personal computing device 400, as depicted in FIG. 4. In particular embodiments, the input term entered by the first user may appear on screen 410 as input term 420. In particular embodiments, personal computing device 400 may be client 130, as depicted in FIG. 1, and client 130 may transmit the input term to social networking system 122 via network 110. In particular embodiments, the first user may be associated with a first user node of a social graph.

In particular embodiments, step 530 may comprise providing predictive typeahead results as the first user enters the input term, each predictive typeahead result including at least one image. In particular embodiments, predictive typeahead results may be generated by social networking system 122, as depicted in FIG. 1, and transmitted to client 130 via network 150. In particular embodiments, client 130 may be personal computing device 400, as depicted in FIG. 4, and the predictive typeahead results may be displayed as predictive typeahead results 435A-C. In particular embodiments, the predictive typeahead results may be based on the input term. In particular embodiments, each predictive typeahead result may correspond to at least one node of the social graph.

Figure 6:
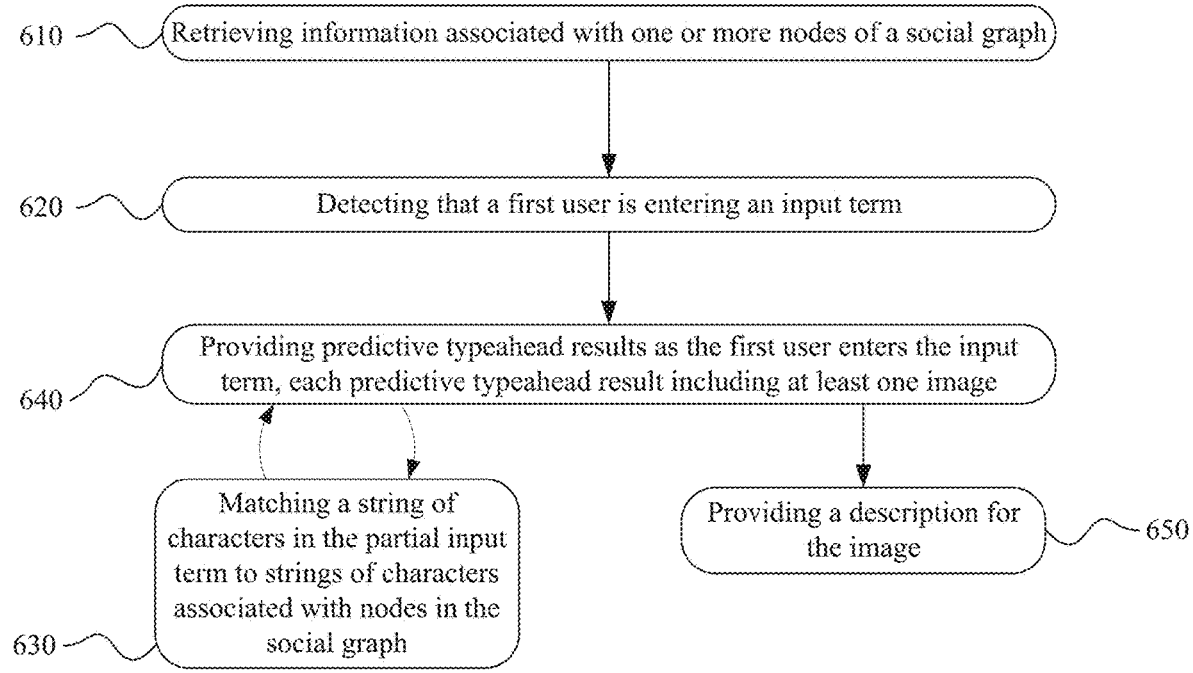
FIG. 6 illustrates an example method for providing predictive typeahead results via matching strings of characters in the input term to strings of characters associated with nodes in a social graph and an example method for providing a description with each image included in a predictive typeahead result.

FIG. 6 illustrates an example method for providing predictive typeahead results via matching strings of characters in an input term to strings of characters associated with nodes in a social graph and an example method for providing a description with each image included in a predictive typeahead result. The method may start at step 610, where a computing device retrieves information associated with one or more nodes of a social graph. At step 620, the computing device may detect that a first user is entering an input term. At step 630, the computing device may match a string of characters in the input term to strings of characters associated with nodes in the social graph. At step 640, the computing device may provide predictive typeahead results as the first user enters the input term, each predictive typeahead result including at least one image. At step 650, the computing device may provide a description for the image. Particular embodiments may repeat the steps of the method of FIG. 6, where appropriate. Moreover, although this disclosure describes and illustrates particular steps of the method of FIG. 6 as occurring in a particular order, this disclosure contemplates any suitable steps of the method of FIG. 6 occurring in any suitable order. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

In particular embodiments, step 610 may comprise retrieving information associated with one or more nodes of a social graph, wherein the information is stored on one or more data stores. In particular embodiments, these data stores may be data stores 140 depicted in FIG. 1. In particular embodiments, a node may comprise a user node or a concept node. In particular embodiments, each node may be connected by edges to other nodes of a social graph.

In particular embodiments, step 620 may comprise detecting that a first user is entering an input term. In particular embodiments, the first user may enter input criteria on input device 415 of personal computing device 400, as depicted in FIG. 4. In particular embodiments, the input term entered by the first user may appear on screen 410 as input term 420.

In particular embodiments, personal computing device 400 may be client 130, as depicted in FIG. 1, and client 130 may transmit the input criteria to social networking system 122 via network 110. In particular embodiments, the first user may be associated with a first user node of a social graph.

In particular embodiments, step 630 may comprise matching a string of characters in the input term to strings of characters associated with nodes in the social graph. In particular embodiments, the matching may occur every time the computing system detects that the first user has entered another character comprising an input term. In particular embodiments, the matching may occur after the computing system detects that the user has entered a pre-determined number of characters comprising an input term. In particular embodiments, the matching may occur after the computing system detects that the user has entered certain types of characters comprising an input term.

In particular embodiments, step 640 may comprise providing predictive typeahead results as the first user enters the input term, each predictive typeahead result including at least one image. In particular embodiments, predictive typeahead results may be generated by social networking system 122, as depicted in FIG. 1, and transmitted to client 130 via network 150. In particular embodiments, client 130 may be personal computing device 400, as depicted in FIG. 4, and the predictive typeahead results may be displayed as predictive typeahead results 435A-C. In particular embodiments, the predictive typeahead results may be based on the input term. In particular embodiments, each predictive typeahead result may correspond to at least one node of the social graph.

In particular embodiments, step 650 may comprise providing a description for the image. In particular embodiments, the description may be stored on data stores 140, as depicted in FIG. 1, and then transmitted via network 110 to client 130. In particular embodiments, the description may be stored on servers 120 and then transmitted via network 110 to client 130.

Figure 7:
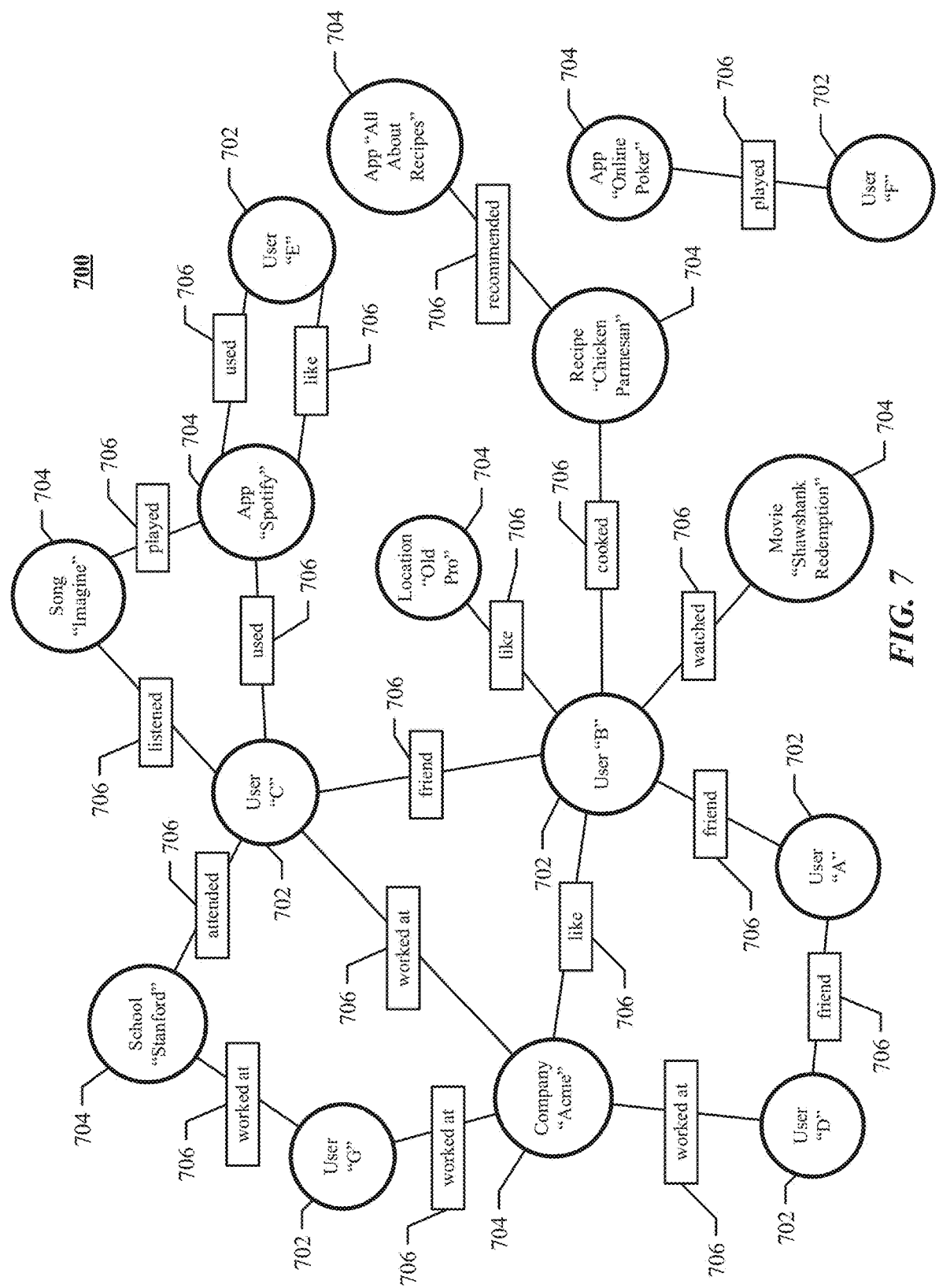
FIG. 7 illustrates an example social graph.

FIG. 7 illustrates example social graph 700. In particular embodiments, social-networking system 160 may store one or more social graphs 700 in one or more data stores. In particular embodiments, social graph 700 may include multiple nodes—which may include multiple user nodes 702 or multiple concept nodes 704—and multiple edges 706 connecting the nodes. Example social graph 700 illustrated in FIG. 7 is shown, for didactic purposes, in a two-dimensional visual map representation. In particular embodiments, a social-networking system 160, client system 130, or third-party system 170 may access social graph 700 and related social-graph information for suitable applications. The nodes and edges of social graph 700 may be stored as data objects, for example, in a data store (such as a social-graph database). Such a data store may include one or more searchable or queryable indexes of nodes or edges of social graph 700.

In particular embodiments, a user node 702 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 702 corresponding to the user, and store the user node 702 in one or more data stores. Users and user nodes 702 described herein may, where appropriate, refer to registered users and user nodes 702 associated with registered users. In addition or as an alternative, users and user nodes 702 described herein may, where appropriate, refer to users that have not registered with social-networking system 160. In particular embodiments, a user node 702 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 702 may be associated with one or more data objects corresponding to information associated with a user. In particular embodiments, a user node 702 may correspond to one or more webpages or one or more user-profile pages (which may be webpages).

In particular embodiments, a concept node 704 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 704 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 704 may be associated with one or more data objects corresponding to information associated with concept node 704. In particular embodiments, a concept node 704 may correspond to a webpage.

In particular embodiments, a node in social graph 700 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 704. Profile pages may be viewable by all or a selected subset of other users. As an example and not by way of limitation, a user node 702 may have a corresponding user-profile page in which the corresponding user may add content, make declarations, or otherwise express himself or herself. As another example and not by way of limitation, a concept node 704 may have a corresponding concept-profile page in which one or more users may add content, make declarations, or express themselves, particularly in relation to the concept corresponding to concept node 704.

In particular embodiments, a concept node 704 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 130 to transmit to social-networking system 160 a message indicating the user's action. In response to the message, social-networking system 160 may create an edge (e.g., an "eat" edge) between a user node 702 corresponding to the user and a concept node 704 corresponding to the third-party webpage or resource and store edge 706 in one or more data stores.

In particular embodiments, a pair of nodes in social graph 700 may be connected to each other by one or more edges 706. An edge 706 connecting a pair of nodes may represent a relationship between the pair of nodes. In particular embodiments, an edge 706 may include or represent one or more data objects or attributes corresponding to the relationship between a pair of nodes. As an example and not by way of limitation, a first user may indicate that a second user is a "friend" of the first user. In response to this indication, social-networking system 160 may transmit a "friend request" to the second user. If the second user confirms the "friend request," social-networking system 160 may create an edge 706 connecting the first user's user node 702 to the second user's user node 702 in social graph 700 and store edge 706 as social-graph information in one or more of data stores 24. In the example of FIG. 7, social graph 700 includes an edge 706 indicating a friend relation between user nodes 702 of user "A" and user "B" and an edge indicating a friend relation between user nodes 702 of user "C" and user "B." Although this disclosure describes or illustrates particular edges 706 with particular attributes connecting particular user nodes 702, this disclosure contemplates any suitable edges 706 with any suitable attributes connecting user nodes 702. As an example and not by way of limitation, an edge 706 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 700 by one or more edges 706.

In particular embodiments, an edge 706 between a user node 702 and a concept node 704 may represent a particular action or activity performed by a user associated with user node 702 toward a concept associated with a concept node 704. As an example and not by way of limitation, as illustrated in FIG. 7, a user may "like," "attended," "played," "listened," "cooked," "worked at," or "watched" a concept, each of which may correspond to a edge type or subtype. A concept-profile page corresponding to a concept node 704 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 160 may create a "listened" edge 706 and a "used" edge (as illustrated in FIG. 7) between user nodes 702 corresponding to the user and concept nodes 704 corresponding to the song and application to indicate that the user listened to the song and used the application. Moreover, social-networking system 160 may create a "played" edge 706 (as illustrated in FIG. 7) between concept nodes 704 corresponding to the song and the application to indicate that the particular song was played by the particular application. In this case, "played" edge 706 corresponds to an action performed by an external application (SPOTIFY) on an external audio file (the song "Imagine"). Although this disclosure describes particular edges 706 with particular attributes connecting user nodes 702 and concept nodes 704, this disclosure contemplates any suitable edges 706 with any suitable attributes connecting user nodes 702 and concept nodes 704. Moreover, although this disclosure describes edges between a user node 702 and a concept node 704 representing a single relationship, this disclosure contemplates edges between a user node 702 and a concept node 704 representing one or more relationships. As an example and not by way of limitation, an edge 706 may represent both that a user likes and has used at a particular concept. Alternatively, another edge 706 may represent each type of relationship (or multiples of a single relationship) between a user node 702 and a concept node 704 (as illustrated in FIG. 7 between user node 702 for user "E" and concept node 704 for "SPOTIFY").

In particular embodiments, social-networking system 160 may create an edge 706 between a user node 702 and a concept node 704 in social graph 700. As an example and not by way of limitation, a user viewing a concept-profile page (such as, for example, by using a web browser or a special-purpose application hosted by the user's client system 130) may indicate that he or she likes the concept represented by the concept node 704 by clicking or selecting a "Like" icon, which may cause the user's client system 130 to transmit to social-networking networking system 160 a message indicating the user's liking of the concept associated with the concept-profile page. In response to the message, social-networking system 160 may create an edge 706 between user node 702 associated with the user and concept node 704, as illustrated by "like" edge 706 between the user and concept node 704. In particular embodiments, social-networking system 160 may store an edge 706 in one or more data stores. In particular embodiments, an edge 706 may be automatically formed by social-networking system 160 in response to a particular user action. As an example and not by way of limitation, if a first user uploads a picture, watches a movie, or listens to a song, an edge 706 may be formed between user node 702 corresponding to the first user and concept nodes 704 corresponding to those concepts. Although this disclosure describes forming particular edges 706 in particular manners, this disclosure contemplates forming any suitable edges 706 in any suitable manner.

Figure 8:
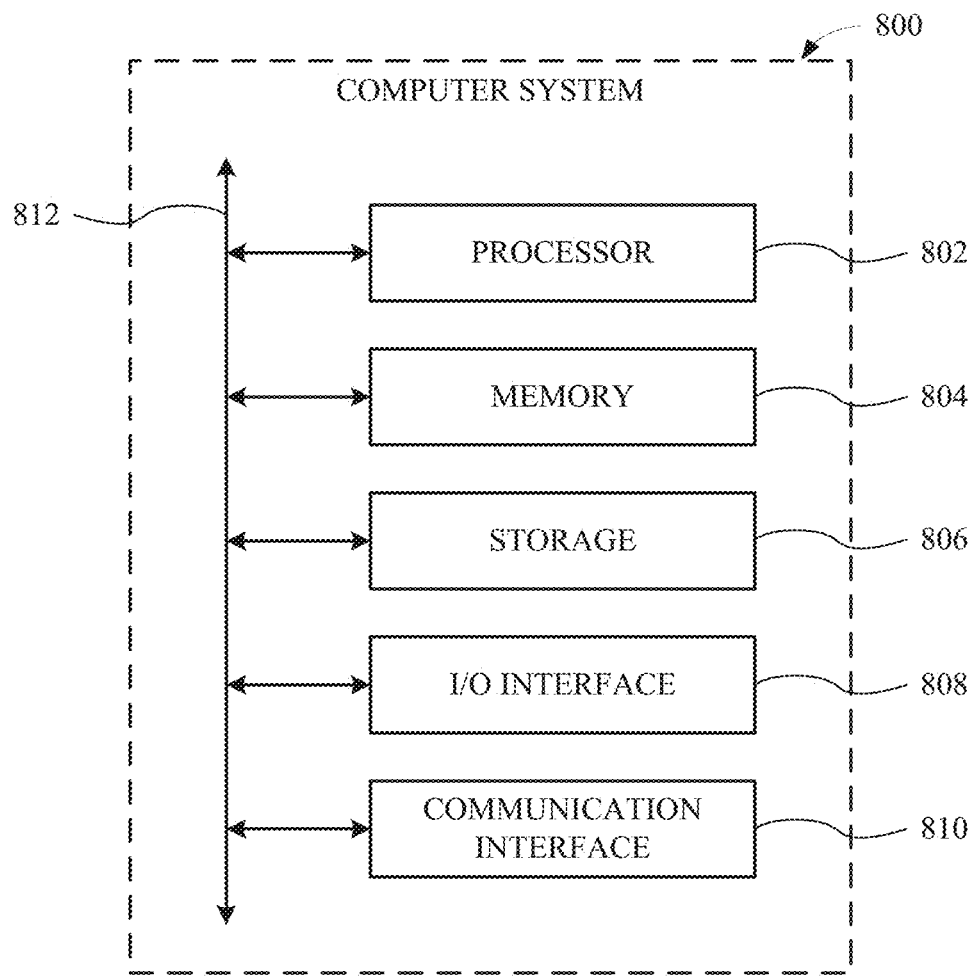
FIG. 8 illustrates an example computer system for performing particular embodiments.

FIG. 8 illustrates an example computer system 800. In the example of FIG. 8, one or more computer systems 800 may perform one or more steps of one or more methods described or illustrated herein. In particular embodiments, one or more computer systems 800 provide functionality described or illustrated herein. In particular embodiments, software running on one or more computer systems 800 performs one or more steps of one or more methods described or illustrated herein or provides functionality described or illustrated herein. Particular embodiments include one or more portions of one or more computer systems 800.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 800 may include one or more computer systems 800; be unitary or distributed; span multiple locations; span multiple machines; span multiple datacenters; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. Although this disclosure describes and illustrates particular memory, this disclosure contemplates any suitable memory.

In particular embodiments, storage 806 includes mass storage for data or instructions. Storage 806 may include removable or non-removable (i.e., fixed) media, where appropriate. Storage 806 may be internal or external to computer system 800, where appropriate. In particular embodiments, storage 806 is non-volatile, solid-state memory. Where appropriate, storage 806 may include one or more storages 806. Although this disclosure describes and illustrates particular storage, this disclosure contemplates any suitable storage.

In particular embodiments, I/O interface 808 includes hardware, software, or both providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touchscreen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a Wi-Fi network. This disclosure contemplates any suitable network and any suitable communication interface 810 for it. Although this disclosure describes and illustrates a particular communication interface, this disclosure contemplates any suitable communication interface.

In particular embodiments, bus 812 includes hardware, software, or both coupling components of computer system

800 to each other. Although this disclosure describes and illustrates a particular bus, this disclosure contemplates any suitable bus or interconnect.

Herein, reference to a computer-readable storage medium encompasses one or more non-transitory, tangible, computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. § 101. Herein, reference to a computer-readable storage medium excludes transitory forms of signal transmission (such as a propagating electrical or electromagnetic signal per se) to the extent that they are not eligible for patent protection under 35 U.S.C. § 101. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of processor 802 (such as, for example, one or more internal registers or caches), one or more portions of memory 804, one or more portions of storage 806, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure. For example, although the foregoing embodiments have been described in the context of a social network system, it will apparent to one of ordinary skill in the art that the invention may be used with any electronic social network service and, even if it is not provided through a website. Any computer-based system that provides social networking functionality can be used in accordance with the present invention even if it relies, for example, on e-mail, instant messaging or other form of peer-to-peer communications, and any other technique for communicating between users. The invention is thus not limited to any particular type of communication system, network, protocol, format or application.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

While the foregoing processes and mechanisms can be implemented by a wide variety of physical systems and in a wide variety of network and computing environments, the server or computing systems described below provide example computing system architectures for didactic, rather than limiting, purposes.

The present invention has been explained with reference to specific embodiments. For example, while embodiments of the present invention have been described as operating in connection with a social network system, the present invention can be used in connection with any communications facility that allows for communication of messages between users, such as an email hosting site. Other embodiments will be evident to those of ordinary skill in the art. It is therefore not intended that the present invention be limited, except as indicated by the appended claims.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
locally storing, at a client device of a first user, information associated with a plurality of nodes and a plurality of edges of a social graph received from a social-networking system, the first user being associated with a first node of the social graph;
detecting, by the client device, that the first user is entering an input term;
providing, by the client device, predictive typeahead results as the first user enters the input term, the predictive typeahead results being based on the input term, each predictive typeahead result corresponding to one of the nodes of the social graph stored locally on the client device, each predictive typeahead result including at least one image associated with the corresponding node.

2. The method of claim 1, wherein providing a predictive typeahead result comprises matching a string of characters included in the input term to one or more strings of characters associated with the plurality of nodes or the plurality of edges of the social graph locally stored at the client device.

3. The method of claim 2, wherein matching the string of characters comprises accessing an internal cache of the client device based on the one or more strings of characters associated with the information associated with the plurality of nodes or the plurality of edges of the social graph.

4. The method of claim 1, wherein:
at least one node of the social graph comprises a second user node associated with a second user; and
providing a predictive typeahead result corresponding to one of the nodes of the social graph stored locally on the client device comprises providing, based on a measure of affinity between the first user and the second user corresponding to the second user node, a predictive typeahead result corresponding to the second user node.

5. The method of claim 1, wherein:
at least one node in the social graph comprises a concept node associated with a concept; and
providing a predictive typeahead result corresponding to one of the nodes of the social graph comprises providing, based on a measure of affinity between the first user and the concept corresponding to the concept node, a predictive typeahead result corresponding to the concept node.

6. The method of claim 1, wherein:
at least one node in the social graph comprises a second user node associated with a second user, the social graph identifying a relationship between the first user and the second user;
at least one node in the social graph comprises a concept node associated with a concept; and
providing a predictive typeahead result corresponding to the at least one node comprises providing, based on a measure of affinity between the second user and the concept, a predictive typeahead result corresponding to the concept node.

7. The method of claim 1, wherein the image associated with each typeahead result is associated with a description for the image.

8. The method of claim 7, further comprising providing, by the client device, the respective description for the image included in one of the predictive typeahead results, wherein providing the description for the image comprises one or more of:
responding to a mouse pointer placed over the image, showing a popup window, or
showing text within the image.

9. The method of claim 1, wherein a predictive typeahead result further includes a link to an online resource.

10. The method of claim 9, wherein the link is to a profile interface for the node corresponding to the predictive typeahead result.

11. The method of claim 9, wherein the link is to an online resource on a third-party web site.

12. The method of claim 1, wherein the social graph comprises:
a plurality of nodes corresponding to a plurality of users or concepts of an online social network; and
a plurality of edges connecting the plurality of nodes, each edge of the plurality of edges having a particular edge-type.

13. The method of claim 12, wherein the particular edge-type corresponds to a type of action the first user has taken with respect at least one of the plurality of users or concepts on the online social network.

14. The method of claim 1, wherein the character string inputted by the first user is inputted in an input field and rendered by the client device as each character of the character string is inputted by the user.

15. The method of claim 1, further comprising auto-populating, by the client device, the input field with the one or more predictive typeahead results.

16. The method of claim 1, wherein the character string is sent by a client-side process executing within the client device.

17. The method of claim 1, wherein the predictive typeahead results are displayed as real-time suggestions responsive to one or more characters of the character string thus far inputted by the first user.

18. The method of claim 1, wherein locally storing, at the client device of the first user, information associated with the plurality of nodes and the plurality of edges of the social graph comprises retrieving information from a database index maintained by the social-networking system.

19. One or more computer-readable non-transitory storage media embodying software that is operable when executed to:

locally store, at a client device of a first user, information associated with a plurality of nodes and a plurality of edges of a social graph received from a social-networking system, the first user being associated with a first node of the social graph;

detect that the first user is entering an input term;

provide predictive typeahead results as the first user enters the input term, the predictive typeahead results being based on the input term, each predictive typeahead result corresponding to one of the nodes of the social graph stored locally on the client device, each predictive typeahead result including at least one image associated with the corresponding node.

20. A system comprising: one or more processors; and a memory coupled to the processors comprising instructions executable by the processors, the processors operable when executing the instructions to:

locally store, at a client device of a first user, information associated with a plurality of nodes and a plurality of edges of a social graph received from a social-networking system, the first user being associated with a first node of the social graph;

detect that the first user is entering an input term;

provide predictive typeahead results as the first user enters the input term, the predictive typeahead results being based on the input term, each predictive typeahead result corresponding to one of the nodes of the social graph stored locally on the client device, each predictive typeahead result including at least one image associated with the corresponding node.

* * * * *